UNITED STATES PATENT OFFICE.

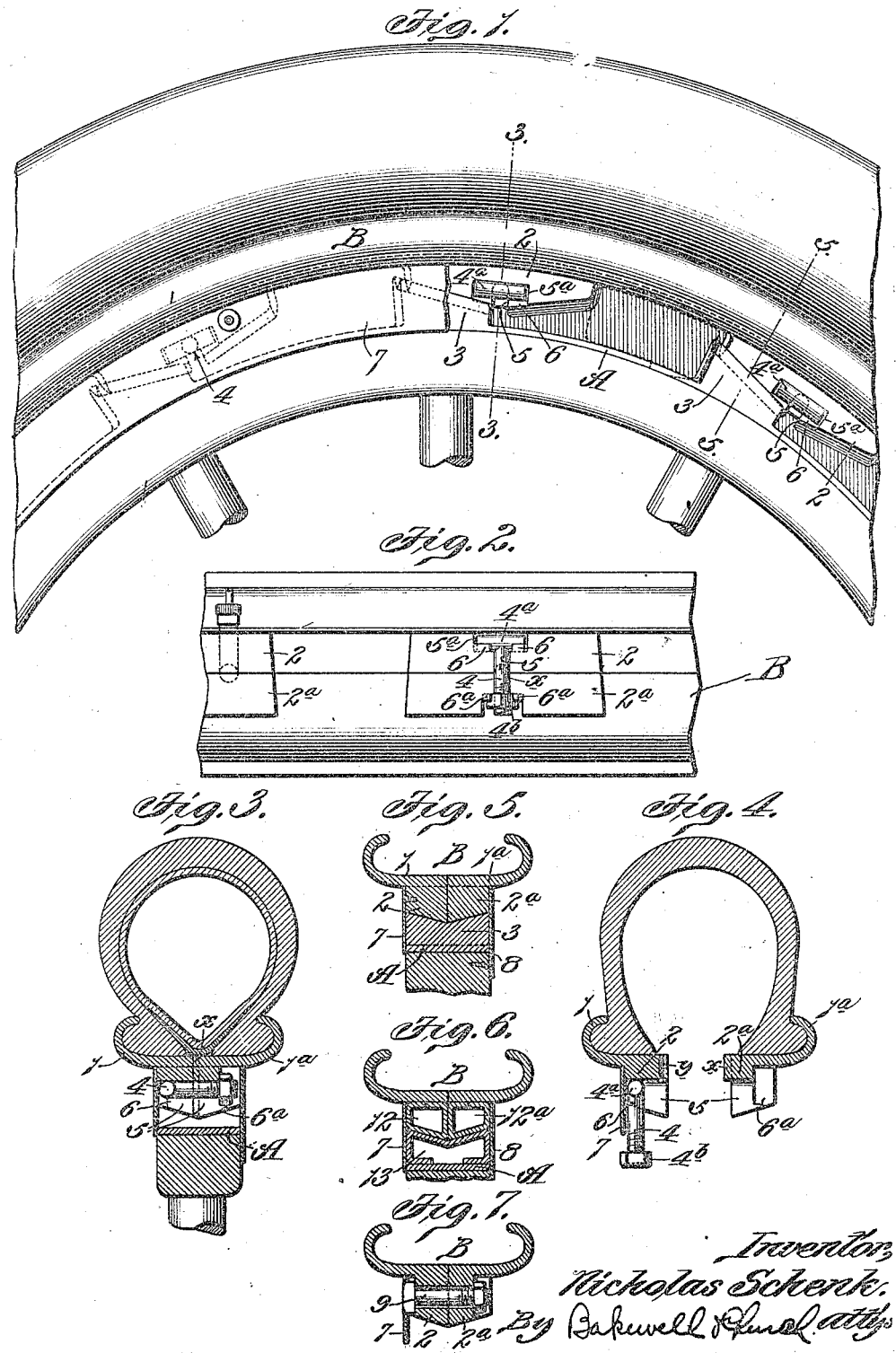

NICHOLAS SCHENK, OF ST. LOUIS, MISSOURI.

SPLIT RIM FOR VEHICLE-WHEELS.

1,173,221.

Specification of Letters Patent. Patented Feb. 29, 1916.

Application filed May 10, 1915. Serial No. 27,085.

*To all whom it may concern:*

Be it known that I, NICHOLAS SCHENK, a citizen of the United States, residing at St. Louis, Missouri, have invented a certain new and useful Improvement in Split Rims for Vehicle-Wheels, of which the following is a full, clear, and exact description, such as will enable others skilled in the art to which it appertains to make and use the same.

This invention relates to demountable rims for vehicle wheels, and has for its main object to provide a demountable rim which is so designed that the inner tube of a pneumatic tire carried by the rim can be removed quickly from the outer casing of the tire without disconnecting the outer casing from the portions of the rim that normally retain the casing in position.

Another object is to provide a demountable rim that consists of a longitudinally split member composed of two laterally separable portions that are held together in a novel manner.

Another object is to provide a longitudinally split, demountable rim whose coöperating portions are held together by devices which are so designed and arranged that there is no liability of their becoming lost or displaced during the operation of changing the inner tube of the tire carried by the rim. And still another object is to provide a split, demountable rim in which the coöperating parts on the fixed rim and on the demountable rim that hold the demountable rim in operative position also tend to prevent the two portions of the demountable rim from spreading apart or separating laterally.

Other objects and desirable features of my invention will be hereinafter pointed out.

Figure 1 of the drawings is a side elevational view, partly broken away, of a portion of a wheel equipped with a demountable rim constructed in accordance with my invention. Fig. 2 is a plan view, showing the inner side of the demountable rim. Fig. 3 is a cross-sectional view taken on the line 3—3 of Fig. 1. Fig. 4 is a similar view, showing the two portions of the demountable rim separated. Fig. 5 is a cross-sectional view taken on the line 5—5 of Fig. 1; and Figs. 6 and 7 are cross-sectional views, illustrating slight modifications of my invention.

Briefly described, my invention consists in a demountable rim composed of two laterally separable portions that are provided with flanges for embracing the beads on the outer casing of a pneumatic tire, said portions when in operative position forming a longitudinally split rim that is substantially channel-shaped in cross section. The two portions of said rim are held securely together by members that pass transversely through same, and in the preferred form of my invention as herein shown, the rim is provided on its inner side with pairs of coöperating parts that engage devices on the fixed rim which hold the demountable rim centered and prevent it from moving circumferentially in one direction, said devices and parts being so designed that they also serve to prevent the two portions of the demountable rim from separating laterally or spreading apart.

Referring to the drawings, which illustrate the preferred form of my invention, A designates the fixed rim on the felly of the wheel and B designates the demountable rim that surrounds the fixed rim. Said demountable rim consists of a longitudinal split member composed of two portions 1 and 1ª that are provided with flanges for engaging the beads on the outer casing of a pneumatic tire, as shown in Fig. 3, said portions 1 and 1ª being adapted to be spread apart or separated laterally, as shown in Fig. 4, so as to enable the inner tube of the tire to be removed from the outer casing or arranged inside of the casing without disconnecting the casing from the portions 1 and 1ª of the demountable rim. When the two portions 1 and 1ª of the demountable rim are in normal position, as shown in Fig. 3, they form a longitudinally split rim of approximately channel-shape in cross section whose side flanges snugly embrace the beads on the outer casing of the tire. Said portions are held together by members, hereinafter described, that pass transversely through said portions and they are also provided with coöperating parts which are embraced by devices on the fixed rim A that tend to prevent the portions 1 and 1ª of the demountable rim from spreading apart, said devices and parts also coöperating with each other to hold the demountable rim centered with relation to the fixed rim and prevent the demountable rim from moving circumferentially in one direction. In the form of my invention herein shown the fixed rim A is provided with a plurality of spaced blocks or devices 3, each of which has a longitudinally-inclined top face, as shown in Fig. 1, that is substantially V-shaped in cross section, as shown in Fig. 5. The two portions 1 and 1ª of the demountable rim 1ᵇ are provided on their inner sides with coöperating parts 2 and 2ª which form a plurality of spaced blocks or projections on the inner side of the demountable rim when the portions 1 and 1ª are in their normal position, as shown in Fig. 5, the blocks on the demountable rim, formed by the coöperating parts 2 and 2ª, being inclined longitudinally oppositely to the blocks 3 on the fixed rim and being of such cross-sectional shape that they will conform to the top faces of the blocks 3 on the fixed rim on which they bear when the demountable rim is in operative position, thus forming a structure in which the demountable rim is provided with a plurality of spaced devices, each of which embraces a pair of coöperating parts in a longitudinally split demountable rim. The coöperating parts 2 and 2ª on the demountable rim are preferably so designed that the demountable rim can be used either on a right or on a left wheel, said parts 2 and 2ª being tapered longitudinally in opposite directions from the transverse center of same, as shown in Fig. 1, and thus virtually forming two sets of oppositely-inclined blocks, one set of which coöperate with the blocks 3 on the fixed rim when the demountable rim is used on a right wheel and the other set coöperating with the blocks 3 when the demountable rim is used on a left wheel.

After the two portions 1 and 1ª of the demountable rim have been connected together in a manner hereinafter described the demountable rim B is slipped sidewise over the fixed rim and then moved circumferentially to the left, looking at Fig. 1, so as to cause the pairs of coöperating parts 2 and 2ª on the inner side of the demountable rim to engage the blocks 3 on the fixed rim, thereby causing the demountable rim to be centered with respect to the fixed rim and held securely against circumferential movement to the left, looking at Fig. 1.

Various means may be employed for locking the demountable rim in operative position and for preventing it from moving circumferentially in the opposite direction, namely, to the right, looking at Fig. 1, but the means that I prefer to use for this purpose consists of a locking member shown in broken lines in Fig. 1 that is arranged between the two rims A and B at such a point that it will bear against the front end of one of the b'cks 3 on the fixed rim and against the rear ends of the adjacent pair of parts 2 and 2ª on the demountable rim, lying at the left of said block 3, said locking member being so designed and arranged that it automatically takes up any slight circumferential play or movement that develops between the rims.

The two portions 1 and 1ª of the demountable rim are secured together, primarily, by fastening members 4 that extend transversely of said portions and prevent them from separating laterally or spreading apart. It is immaterial, so far as my broad idea is concerned, how the transversely-disposed fastening members 4 are combined with the two portions 1 and 1ª of the rim, but I prefer to mount the fastening members 4 in the coöperating parts 2 and 2ª on the inner side of the demountable rim B, it being immaterial whether a fastening member 4 is combined with each pair of parts 2 and 2ª or only with a few of said pairs of parts. The fastening members 4 preferably consist of bolts that extend transversely through slots 5 in the parts 2 and 2ª and are combined with said parts in such a manner that said fastening members 4 can be swung into the position shown in Fig. 4 when it is desired to separate the two portions 1 and 1ª of the demountable rim without going to the trouble of completely removing the adjustable elements, namely, the nuts 4ᵇ on said fastening members. One convenient way of constructing the rim is to provide each of the fastening members 4 with a head 4ª, as shown in Figs. 2, 3 and 4, that is seated in a recess 5ª formed in the parts 2 with which said fastening member coöperates, the companion part 2ª being provided with a recess for receiving the nut 4ᵇ on the opposite end of said fastening member. Lugs 6 on the part 2 lap over the head 4ª on the fastening member 4, as shown in Fig. 2, so as to hold the head 4ª on the fastening member in the recess 5ª and prevent the fastening member 4 from becoming completely detached from the part 2 when said fastening member is swung downwardly into the position shown in Fig. 4 during the operation of removing or inserting the inner tube of the tire. Lugs 6ª on the part 2ª coöperate with the nut 4ᵇ when the fastening member 4 is arranged in operative position, as shown in Fig. 3, so as to prevent said fastening member from swinging downwardly accidentally. A cover plate 7 on the portion 1 of the demountable rim that extends circumferentially around same acts as a closure for the outer ends of the recesses 5ª in the parts 2, and thus coöperates with the lugs 6 previously mentioned to pivotally connect the fastening members 4 to the portion 1 of the demountable rim. A similar cover plate 8 that is secured to the fixed rim A of the wheel acts as a closure for the recesses in the parts 2ª on the demountable rim in which the nuts 4ᵇ of the fastening members are seated, said cover plates 7 and 8 effectively preventing dirt from becoming packed in the open space between the two rims when the wheel is in use. After the demountable rim has been removed from the fixed rim of the wheel the inner tube of the tire can be removed easily from the outer casing without disconnecting the outer casing from the portions 1 and 1$^a$ of the demountable rim, by simply loosening the nuts 4$^b$ on the fastening members 4 sufficiently to enable said fastening members to be swung into the position shown in Fig. 4, thereby releasing the portion 1$^a$ of the demountable rim and permitting the two portions of the rim to be separated transversely. Owing to the fact that the fastening members 4 are pivotally connected to the portion 1 of the demountable rim, there is no liability of said fastening members 4 becoming lost during the operation of changing the inner tube of the tire. And still another desirable feature of such a construction is that it is not necessary to completely remove the nuts 4$^b$ of said fastening members, this, of course, being due to the fact that the fastening members 4 extend transversely through the slots 5 in the coöperating parts 2 and 2$^a$ on the demountable rim. If desired, the part 2$^a$ can be provided with projections $x$, as shown in Fig. 4, that enter recesses $y$ in the part 2 when the two portions of the rim B are in operative position, so as to prevent relative circumferential movement of the two portions 1 and 1$^a$ of said rim.

While I prefer to connect the two portions of the demountable rim together by fastening members which are arranged in transversely-disposed slots in said portions, I do not wish it to be understood that my invention is limited to such a construction, for if desired, the two portions of the demountable rim could be connected together by transversely-disposed bolts 9 that extend through holes formed in the parts 2 and 2$^a$ of the rim, as shown in Fig. 7.

It is, of course, immaterial how the blocks 3 on the fixed rim and the coöperating parts 2 and 2$^a$ on the demountable rim are formed, and while I prefer to construct said parts from blocks of solid metal, formed either integral with or detachably connected to the elements that carry same, they could, of course, consist of hollow members or pressed members, as shown in Fig. 5, wherein the projections on the fixed rim consist of hollow members 13 connected to same in any suitable manner, and the coöperating parts on the demountable rim consist of hollow members 12 and 12$^a$ connected to the two portions of the demountable rim.

Having thus described my invention, what I claim, and desire to secure by Letters Patent, is:

1. A demountable rim composed of two laterally separable portions provided on their inner sides with coöperating projections arranged in pairs, and transversely-disposed adjustable fastening members arranged in open alining slots in said coöperating projections.

2. A demountable rim consisting of a longitudinally split member, transversely-disposed fastening devices that connect the two portions of said member together, each of said fastening devices being provided with a head at one end that is arranged at a right angle to the axis of said device, one of said portions being provided with lugs that lap over said head, and a plate on said portion that coöperates with the heads on all of said fastening devices to prevent transverse movement thereof in one direction.

3. A demountable rim, comprising a member that is split longitudinally at approximately the center thereof and provided on its inner side with a plurality of projections having transversely disposed slots therein whose outer ends are enlarged, and fastening members arranged in said slots and provided at one end with heads and at their opposite ends with adjustable elements, said heads and adjustable elements being seated in the enlarged portions of said slots 4. A demountable rim, comprising a longitudinally split member whose portions are provided on their inner sides with coöperating parts that form a plurality of spaced projections on the inner side of the rim, transversely-disposed fastening members arranged in slots formed in said coöperating parts, said members being contained wholly within said projections, and means for hinging or pivotally connecting said fastening members to one portion of the rim.

5. A demountable rim, comprising a longitudinally split member whose portions are provided on their inner sides with coöperating parts that form a plurality of spaced projections on the inner side of the rim, transversely-disposed fastening members arranged in slots formed in said coöperating parts, heads on said fastening members seated in recesses at one end of said slots, and a plate on one of the rim portions that coöperates with the heads on all of said fastening devices to prevent said devices from becoming completely disconnected from that portion of the rim.

6. A demountable rim consisting of a longitudinally split member provided on its inner side with a plurality of pairs of coöperating parts that form projections, transversely-disposed fastening members arranged in slots in said parts, each of said parts having a recess at one end of the slot therein, a head and an adjustable element on the opposite ends of said fastening member that are seated wholly within said recesses, and lugs on said parts that coöperate with said head and adjustable element to prevent accidental displacement of said fastening member.

7. A demountable rim consisting of a longitudinally split member composed of two laterally separable portions provided on their inner sides with coöperating parts that form spaced projections, transversely-disposed fastening members arranged in slots in said coöperating parts and lying wholly within said projections, and a circular cover plate on one portion of the rim that protects said fastening members.

In testimony whereof I hereunto affix my signature in the presence of two witnesses, this fifth day of May, 1915.

NICHOLAS SCHENK.

Witnesses:
WELLS L. CHURCH,
GEORGE BAKEWELL.